United States Patent
Furukawa et al.

[11] Patent Number: 5,836,663
[45] Date of Patent: Nov. 17, 1998

[54] MOUNT BASES FOR AN ABSORPTION REFRIGERATOR

[75] Inventors: Masahiro Furukawa; Sumio Ikeda; Hisao Miyazaki, all of Gunma-ken, Japan

[73] Assignee: Sanyo Electric Co., Ltd., Osaka-fu, Japan

[21] Appl. No.: 735,429

[22] Filed: Oct. 22, 1996

[30] Foreign Application Priority Data

Oct. 24, 1995 [JP] Japan .................................. 7-275567

[51] Int. Cl.$^6$ .................................................. F16M 11/22
[52] U.S. Cl. .................................. 312/351.5; 248/188.1; 248/676; 312/351.1
[58] Field of Search .................... 312/351.5, 351.7, 312/351.3, 351.1; 248/188.8, 676, 677, 188.1

[56] References Cited

U.S. PATENT DOCUMENTS

| | | | |
|---|---|---|---|
| 1,178,611 | 4/1916 | Weiss | 312/351.7 X |
| 2,172,687 | 9/1939 | Anderson et al. | 248/188.8 X |
| 2,217,788 | 10/1940 | Blake | 248/677 X |
| 2,257,345 | 9/1941 | Mason | 292/128 X |
| 2,514,955 | 10/1950 | Borzell et al. | 248/676 X |
| 2,743,074 | 4/1956 | Bokorney | 248/676 |
| 2,952,949 | 9/1960 | Maker | 248/676 X |
| 3,221,400 | 12/1965 | Halsey | 248/676 |
| 3,311,042 | 3/1967 | Severson | 248/188.1 X |
| 3,655,159 | 4/1972 | Held, Jr. | 248/188.1 |
| 3,819,245 | 6/1974 | Tacke et al. | 312/351.7 |
| 4,088,229 | 5/1978 | Jacoby et al. | 248/188.8 X |
| 5,673,882 | 10/1997 | Huang | 248/188.8 |

FOREIGN PATENT DOCUMENTS

| | | | |
|---|---|---|---|
| 223343 | 9/1962 | Austria | 312/351.7 |
| 1335415 | 7/1963 | France | 248/676 |
| 165249 | 2/1950 | Germany | 248/677 |
| 2812808 | 9/1979 | Germany | 248/188.1 |
| 58209 | 5/1979 | Japan | 248/672 |
| 55573 | 1/1993 | Japan . | |

Primary Examiner—Peter M. Cuomo
Assistant Examiner—David E Allred
Attorney, Agent, or Firm—Weingarten, Schurgin, Gagnebin & Hayes LLP

[57] ABSTRACT

A mount base for use with an absorption refrigerator according to the present invention comprises a plurality of pairs of legs spaced by a distance from each other and mounted to a lower side of the cabinet such as the low-temperature and/or high-temperature cabinet, and a plurality of link plates securely joined to the legs thus forming an inner space defined by four sides beneath the cabinet, and will thus be increased in the physical strength for supporting the low-temperature and/or high-temperature cabinet. When the low-temperature and/or high-temperature cabinet is shaken by e.g. earthquake, it remains supported securely by the combination of the legs and the link plates, more specifically, the legs reinforced with the link plates and thus is prevented from fracture or injury. As the low-temperature and/or high-temperature cabinet is securely supported by the legs and the link plates, its absorber, evaporator, and regenerator are protected from tilting and will hence allow the absorption refrigerator to run without interruption.

4 Claims, 7 Drawing Sheets

MOUNT BASES FOR AN ABSORPTION REFRIGERATOR

BACKGROUND OF THE INVENTION

1. Field of the Invention

The present invention relates to an absorption refrigerator and particularly, to a mount base for use with an absorption refrigerator to support a low-temperature cabinet containing an absorber and/or an evaporator or a high-temperature cabinet containing a regenerator in the absorption refrigerator.

2. Background Art

An absorption refrigerator is disclosed in, for example, Japanese Patent Laid-open Publication 5-5573(1993) in which a couple of low-temperature cabinets including an evaporator and an absorber are placed in two stories with cooling pumps or cooling water pumps mounted by beds thereon.

The foregoing conventional absorption refrigerator is supported by four bar-like legs welded to four corners of a lower side of the low-temperature cabinet. Each of the legs is anchored at the lower end to a foundation made of e.g. concrete. The leg may be made of a U shaped steel which is rigid enough to support the weight of the low-temperature cabinets during the normal running of the absorption refrigerator.

If an excessive degree of vibration caused by earthquake assaults the low-temperature cabinets, an extra stress in addition of the weight of the low-temperature cabinets is applied to the legs which will thus be injured.

With one of the four legs being deformed, the low-temperature cabinets are tilted, whereby the absorbent in the absorber or the refrigerant in the evaporator will move resulting in escape or loss and interrupting the operation of the absorption refrigerator.

SUMMARY OF THE INVENTION

For solving the foregoing problems, a first aspect of the present invention is to provide a mount base for use with an absorption refrigerator to support a low-temperature and/or high-temperature cabinet of the absorption refrigerator, which comprises a plurality of pairs of legs spaced by a distance from each other and mounted to a lower side of the cabinet, and a plurality of link plates securely joined to the legs, thus forming an inner space defined by four sides beneath the cabinet.

Also, a second aspect of the present invention is to provide a mount base for use with an absorption refrigerator to support a low-temperature and/or high-temperature cabinet of the absorption refrigerator, which comprises a plurality of pairs of legs spaced by a distance from each other and mounted to a lower side of the cabinet, a plurality of link plates securely joined to the legs thus forming an inner space defined by four sides beneath the cabinet, and a mount base foot mounted to at least one of the paired legs and comprising an upright member joined to a side of at least one of the legs opposite to the link plate side and a horizontal sheet mounted to the lower end of the upright member and having a bolt hole(s) therein.

According to a third aspect of the present invention, a mount base for use with an absorption refrigerator to support a low-temperature and/or high-temperature cabinet of the absorption refrigerator is provided comprising at least one upper support leg composed of a plurality of pairs of legs spaced by a distance from each other and mounted to a lower side of the cabinet and a plurality of link plates securely joined to the legs thus forming an inner space defined by four sides beneath the cabinet, and a lower support leg having a box-like shaped wall for supporting the upper support legs.

Also according to a fourth aspect of the present invention, a mount base for use with an absorption refrigerator to support a low-temperature and/or high-temperature cabinet of the absorption refrigerator is provided comprising at least one upper support leg composed of a plurality of pairs of legs spaced by a distance from each other and mounted to a lower side of the cabinet and a plurality of link plates securely joined to the legs thus forming an inner space defined by four sides beneath the cabinet, at least one lower support leg having a box-like shaped wall for supporting the upper support legs, and upright members mounted to lower regions of the box-like shaped wall of the lower support leg.

DETAILED DESCRIPTION OF THE PREFERRED EMBODIMENTS

A first embodiment of the present invention will be described in more details referring to FIGS. 1 to 7.

Figure 1:
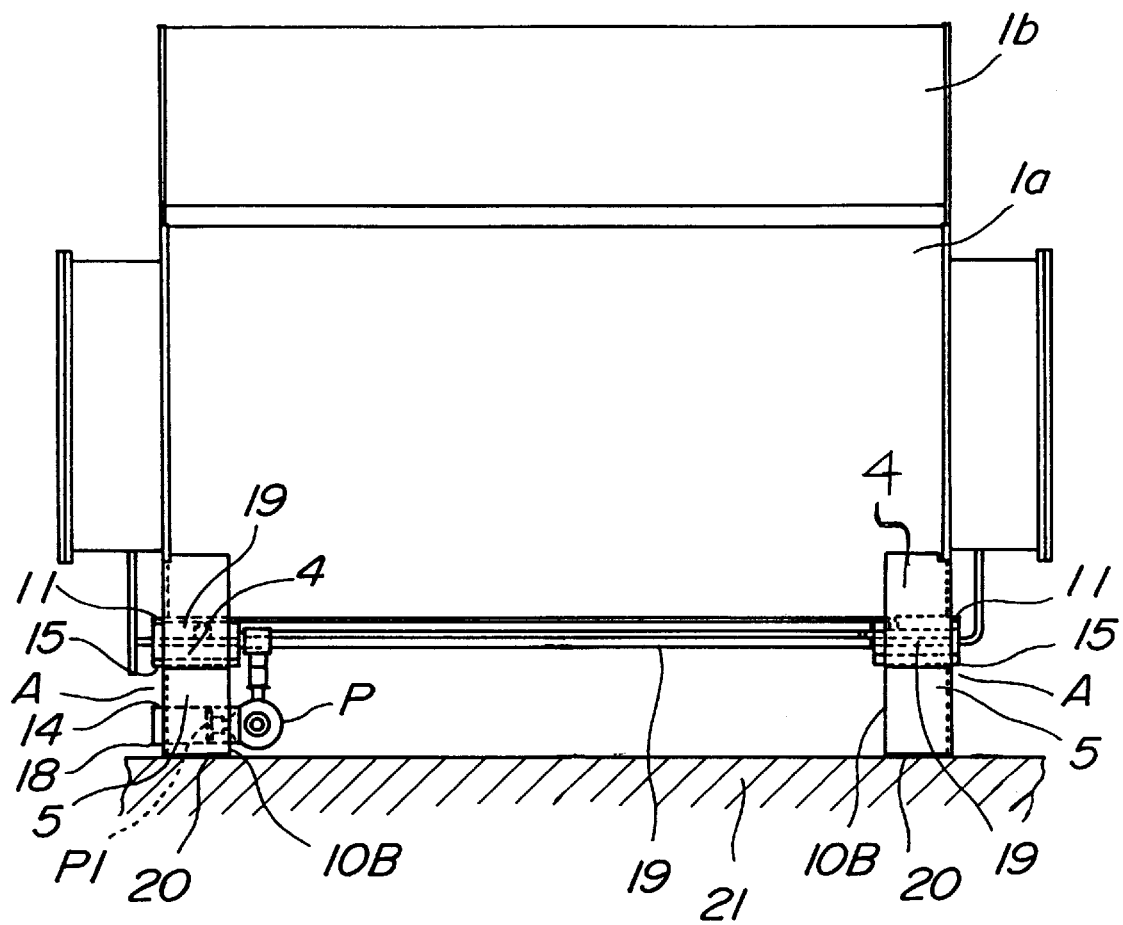
FIG. 1 is a front view of a low-temperature cabinet showing a first embodiment of the present invention.
Figure 2:
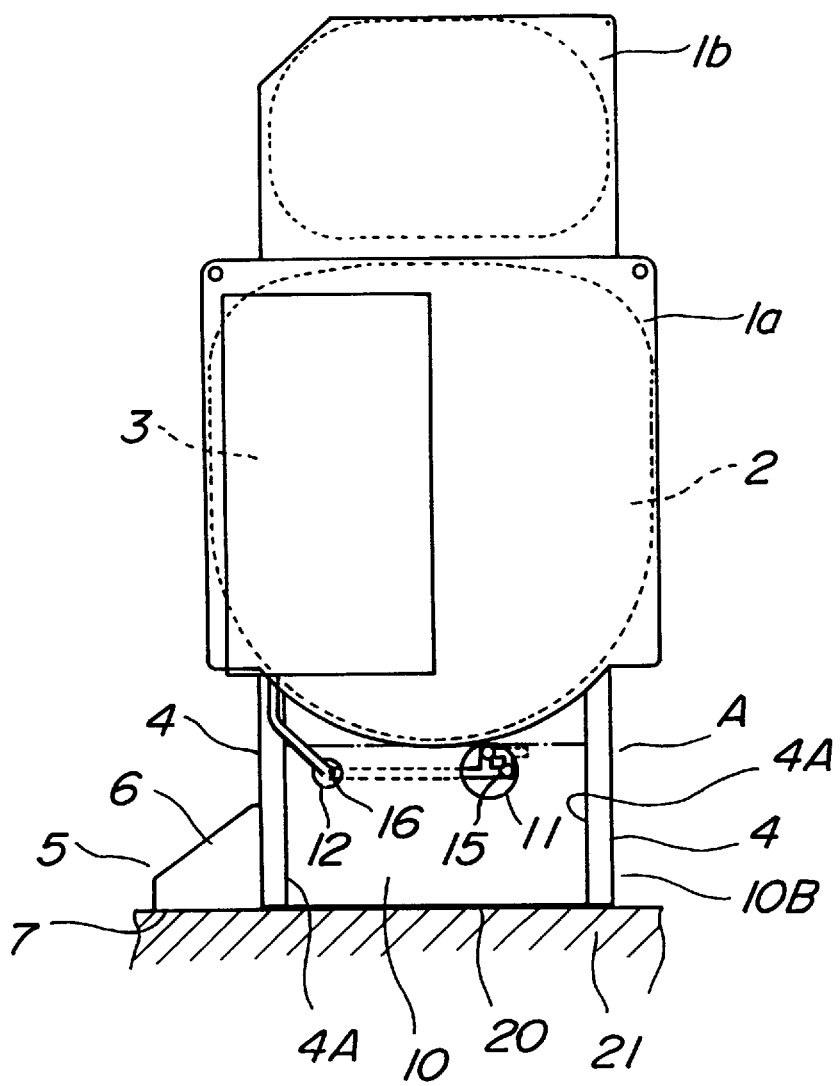
FIG. 2 is a right side view of the low-temperature cabinet shown in FIG. 1.
Figure 3:
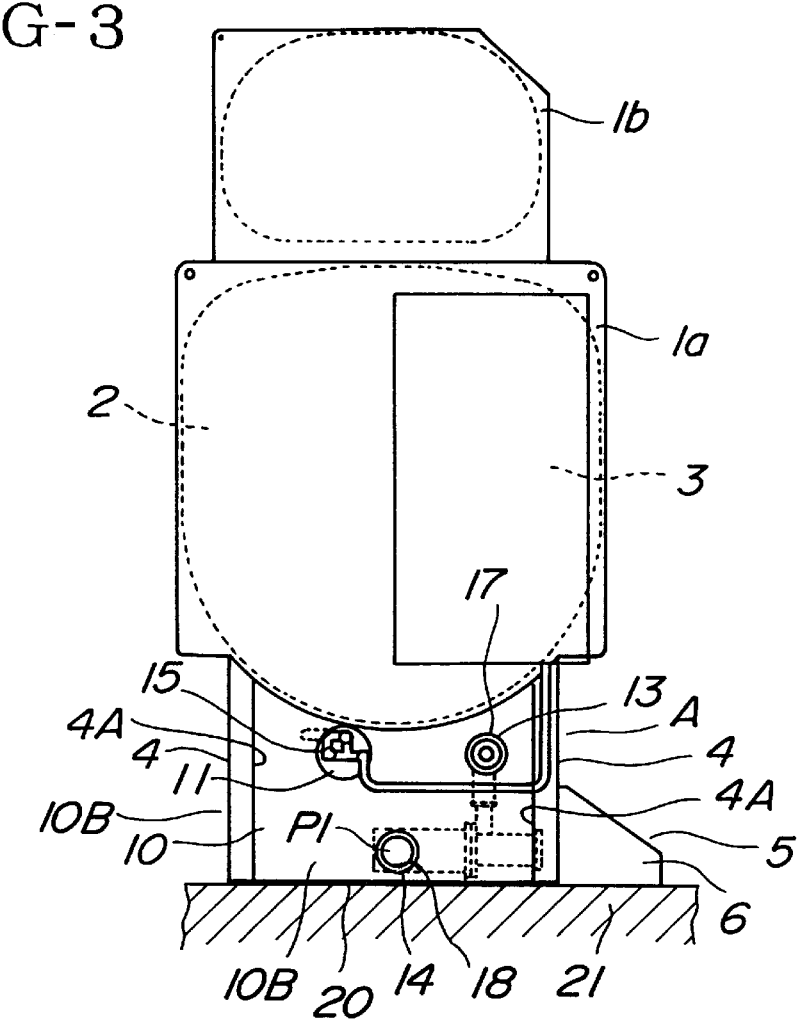
FIG. 3 is a left side view of the low-temperature cabinet shown in FIG. 1.

As shown in FIGS. 1 to 3, there are provided a lower cabinet 1a of an absorption refrigerator (referred to as a low-temperature cabinet) and an upper cabinet 1b mounted on the low-temperature cabinet 1a. The low-temperature cabinet 1a and the upper cabinet 1b may be made of a steel material. The low-temperature cabinet 1a contains an absorber 2 and an evaporator 3. Denoted by A are mount bases joined toga lower side of the low-temperature cabinet 1a for supporting the same.

The mount base A is now explained in details. A foot 4 is made of a structural material such as steel having a U shape in horizontally cross section and welded at its upper end to the lower side of the low-temperature cabinet 1a. More specifically, two pairs of the front and rear legs 4 are provided at both, left and right, ends of the lower side of the low-temperature cabinet 1a, each front and rear pair arranged with their openings 4A facing each other.

A couple of feet 5 are secured by e.g. welding to the lower ends of the two front legs 4 respectively. The foot 5 is made of a structural material such as steel and comprises an upright member 6 having a U shape in horizontally cross section and joined by e.g. welding to the front side of the front leg 4 and a horizontal sheet 7 extending along the upright member 6 to a front opening 6A. The horizontal sheet 7 has bolts holes 8 provided therein at proper locations.

Each pair of the legs 4 spaced from each other are joined to each other by two link plates 10 made of a structural material such as steel. The link plates 10 are secured at both ends by e.g. butt welding to the facing sides of the legs 4. Accordingly, the legs 4 and the two link plates 10 form a box 10B having an inner space 10A. The two link plates 10 are provided with pipe apertures 11, 12, 13, and 14 for accepting pipes 15, 16, 17, and 18 of corresponding diameters respectively. The pipes 15, 16, and 17 are connected to the absorber 2, the evaporator 3, and other unshown devices of the absorption refrigerator including a low-temperature regenerator and a condenser. A tube 19 for circulation of an absorbent, a refrigerant, or a cooling water extends in and along the pipes 15, 16, and 17 in no direct contact with their inner walls. The pipe 18 accommodates a part P1 extending horizontally from an absorbent pump P mounted across the absorbent tube.

A bottom sheet 20 is secured by e.g. welding to the lower ends of the legs 4 and the two link plates 10. The space 10A defined by the front and rear legs 4, the two link plates 10, and a bottom of the low-temperature cabinet 1a is closed with the bottom sheet 20.

Figure 4:
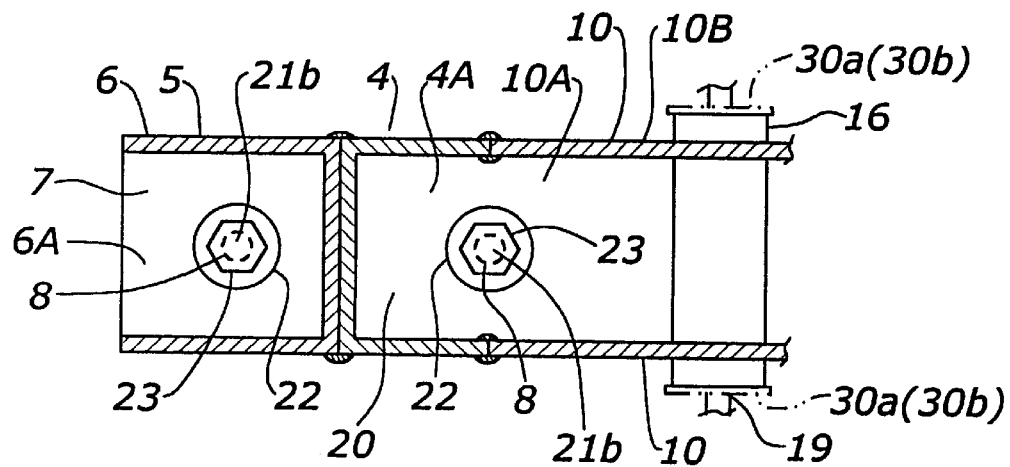
FIG. 4 horizontally cross sectional view of a primary part of a mount base.
Figure 5:
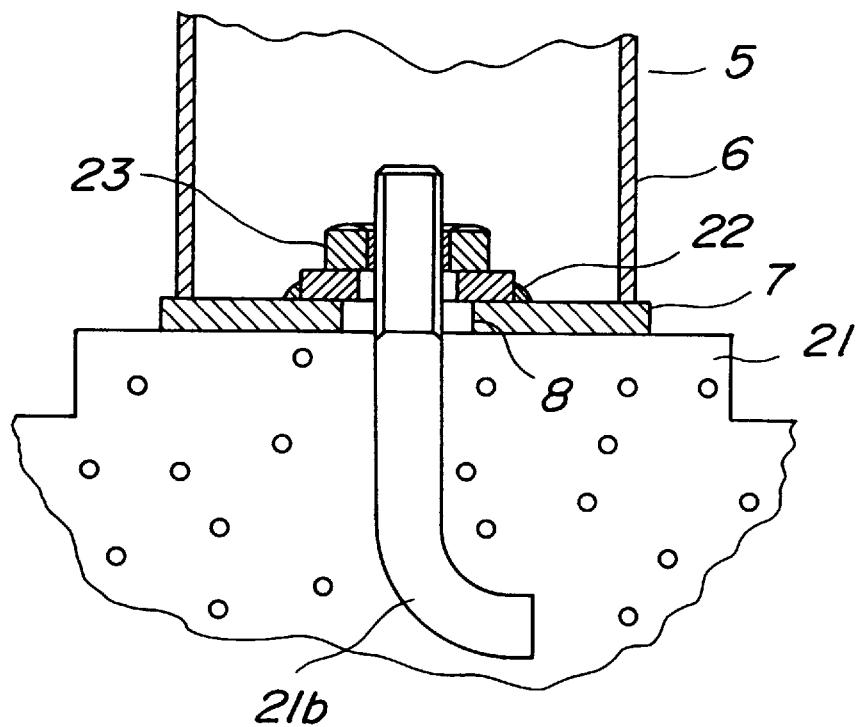
FIG. 5 cross sectional view explaining the anchoring of the mount base to a foundation.

For installation of the absorption refrigerator, the feet 5 are sited with their bolt holes 8 engaged with corresponding anchor bolts 21b which have been implanted in a foundation 21 made of e.g. concrete, as shown in FIGS. 4 and 5. Spacers 22 made of a metal material are fitted onto the anchor bolts 21b and welded to the feet 5 before the bolts 21b are tightened with nuts 23.

Also, the bottom sheets 20 welded to the lower ends of the legs 4 and the link plates 10 have bolt holes 8 provided at both ends therein identical to those of the feet 5. The bottom sheets 20 are equally anchored to the foundation 21 by the anchor bolts 21b, spacers 22, and nuts 23.

According to the first embodiment, each pair of the legs 4 supporting the low-temperature cabinet 1a are joined to each other by the two link plates 10 hence forming in a combination the box 10B. As the four legs 4 are reinforced by the link plates 10, their physical strength for supporting the low-temperature cabinet 1a and the upper cabinet 1b on the low-temperature cabinet 1a is substantially increased. As a result, the legs 4 will be protected by the link plates 10 from any injury whenever the low-temperature cabinet 1a and the upper cabinet 1b are abruptly shaken in an earthquake, thus holding the low-temperature cabinet 1a securely. While the legs 4 are anchored by the feet 5 to the foundation 21, they will support the low-temperature cabinet 1a with consistency. The embodiment will prevent tilting of, the low-temperature cabinet 1a and the upper cabinet 1b hence allowing the absorption refrigerator to run continuously.

The horizontal sheets 7 of the feet 5 secured to the front legs 4 has the bolt holes 8 engaged with the anchor bolts 21b which are tightened with the spacers 22 and the nuts 23. This allows the legs 4 to be anchored by the feet 5 to the foundation 21 simply and securely. Accordingly, the installation of the low-temperature cabinet 1a will be facilitated. As the link plates 10 are used for joining the legs 4 to each other and determining the distance between the feet 5 secured to the left and right front legs 4, they serve as reinforcements and spacers. In case that vibration caused by an earthquake is transmitted via the feet 5 and the legs 4 to the low-temperature cabinet 1a, its generating over-stress on the joints between the feet 5 and the legs 4 (at the upper end of the upright members 6) will be eased by the link plates 10.

The pipes 15, 16, 17, and 18 are mounted in symmetry as fitted into the through holes 11, 12, 13, and 14 of the corresponding diameters in the link plates 10 joined to the legs 4 and the tube 19 connected to the absorber 2 and the evaporator 3 of the absorption refrigerator and to the low-temperature regenerator and the condenser not shown is arranged extending through the pipes 15, 16, 17, and 18. This permits the tube 19 to run directly but not detour the link plates 10, thus minimizing the length of the tube 19, facilitating the piping operation, and reducing the production cost.

The tube 19 extends in and along the pipes 15, 16, and 17 in no direct contact with their inner walls and allows its vibration caused by flows of the absorbent, refrigerant, or cooling water never to transmit to the link plates 10, whereby unwanted oscillation of the link plates 10 will be prevented and the running sound of the absorption refrigerator will be decreased. Also, if a difference in the vibration between the mount bases A and the low-temperature cabinet 1a created by an earthquake causes the displacement of the tube 19, the tube 19 is cleared more or less in the pipes 15, 16, and 17 and its bend or fracture will be avoided. Accordingly, the maintenance will be facilitated.

Figure 6:
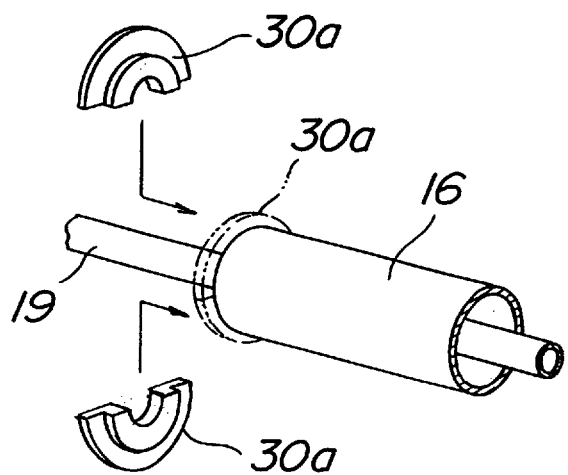
FIG. 6 is an explanatory view of a support structure for a pipe.
Figure 7:
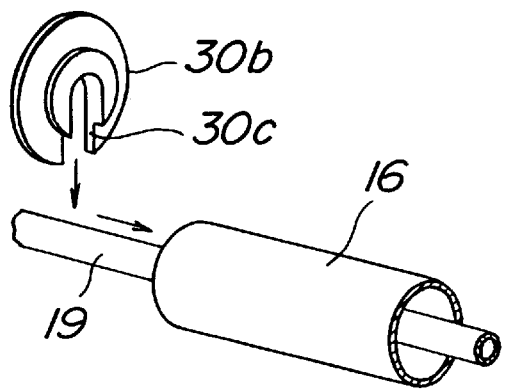
FIG. 7 is an explanatory view of another support structure for the pipe.

As shown in FIGS. 6 and 7, the tube 19 may be suspended by two spacers 30a or 30b (denoted by the dotted lines in FIG.4) mounted to both ends of the pipe 16. The spacers 30a and 30b are made of a resin material having a high resiliency so that the tube 19 is movable relative to the pipes 16 (the link plate 10). Hence, the tube 19 will stay free from injury even if the low-temperature cabinet 1a is shaken.

The spacer 30a comprises two segments abutted to each other as shown in FIG. 6. The spacer 30b has a notch 30c provided in a lower end thereof. The tube 19 is controlled to a position by the spacers 30b except the lower direction.

The same effect is expected by the link plates 10 being not directly joined to the lower end of the low-temperature cabinet 1a but secured to the legs 4 and spaced by a distance from the low-temperature cabinet 1a as denoted by the dotted line in FIG. 2. When the link plates 10 are fixedly secured at upper end to the low-temperature cabinet 1a as shown in the embodiment, the low-temperature cabinet 1a itself acts as a reinforcement increasing the overall structural strength.

Figure 8:
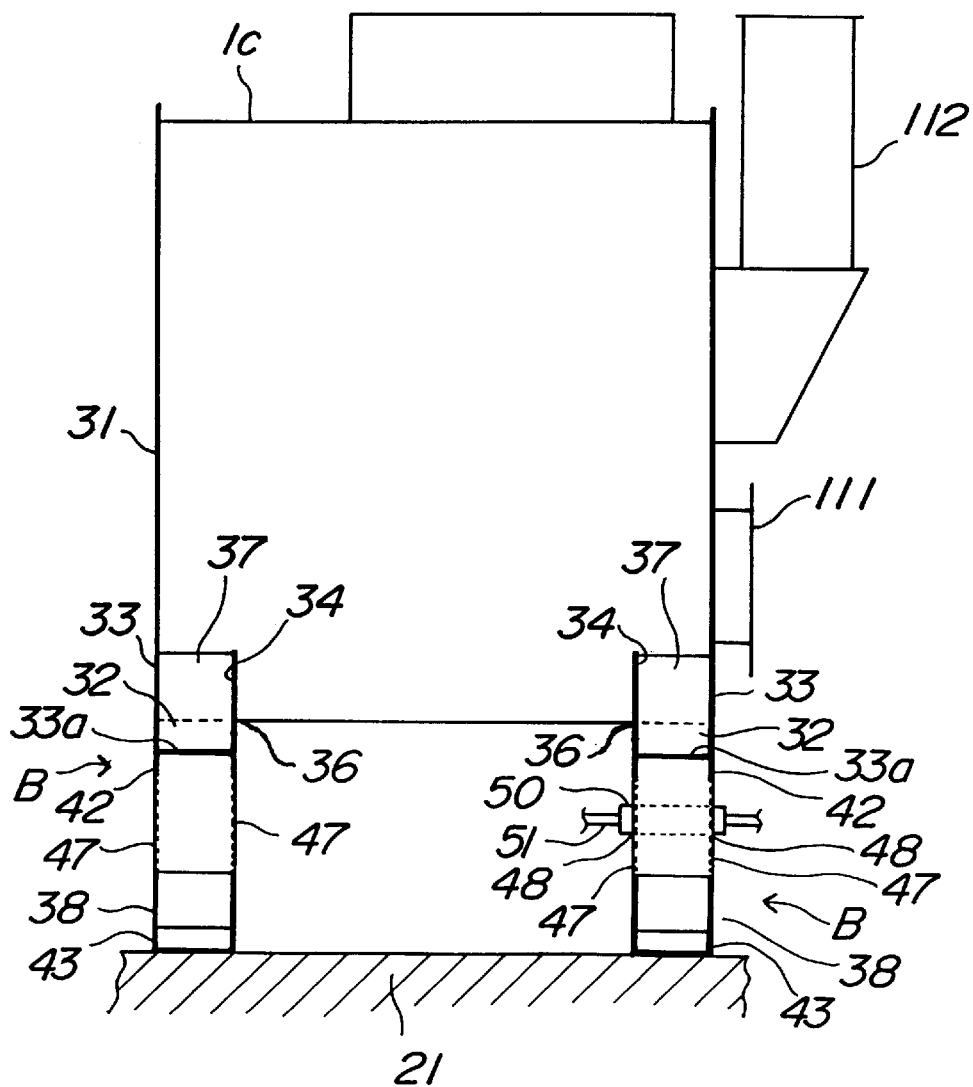
FIG. 8 is a front view of a high-temperature cabinet showing a embodiment of the present invention.
Figure 9:
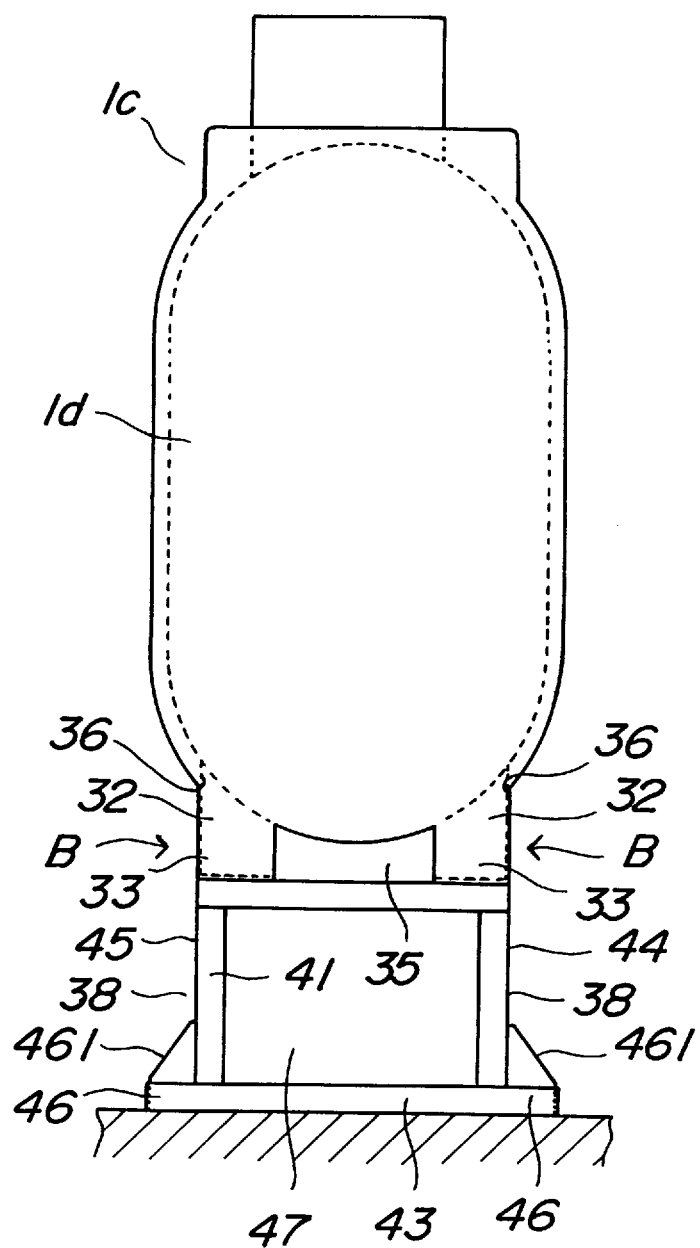
FIG. 9 is a right side view of the high-temperature cabinet showing in FIG. 8.
Figure 10:
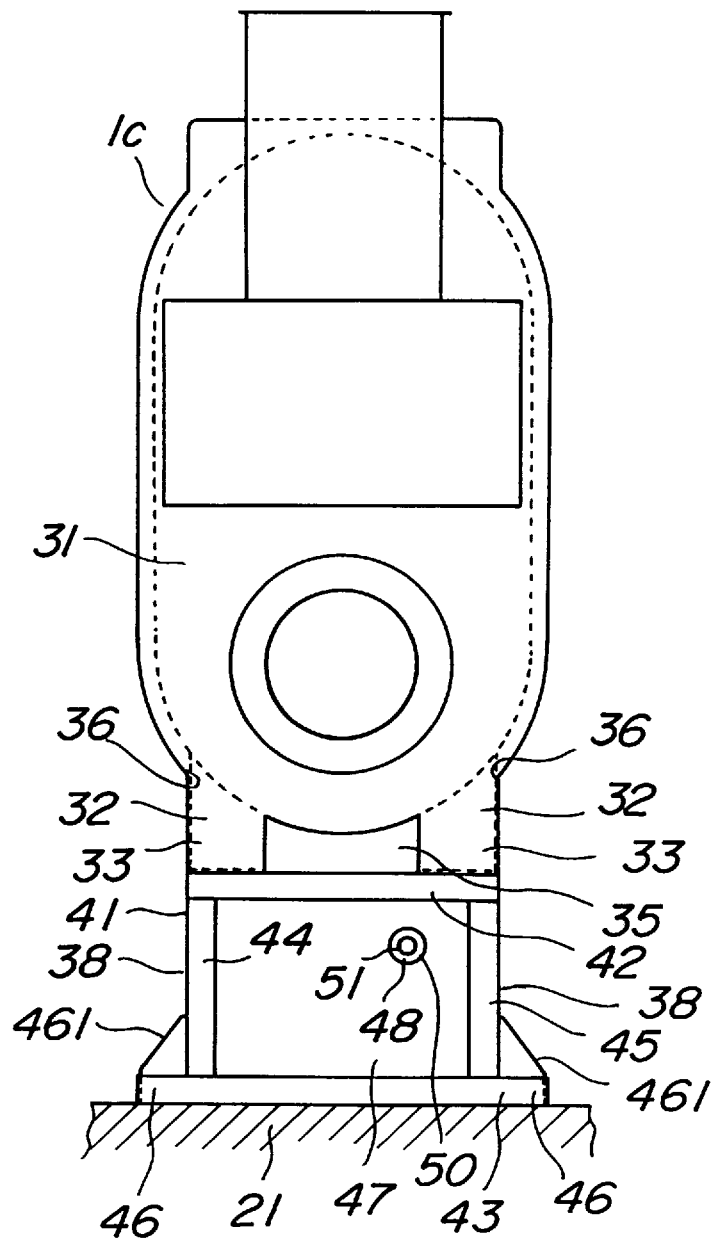
FIG. 10 is a left side view of the high-temperature cabinet shown in FIG. 8.

A second embodiment of the present invention will now be described referring to FIGS. 8 to 10.

As shown, a high-temperature cabinet 1c is a high-temperature regenerator of the absorption refrigerator. There are also provided a burner mount 111 and an exhaust gas duct 112. A wall panel 31 of the high-pressure cabinet 1c is joined at both sides of the lower end with two upper support legs 32, each forming a box shape together with a part of the wall panel 31. The construction of the upper support leg 32 is explained in more details. The wall panel 31 is provided with two, left and right, sides, each side having two planar leg portions 33 formed of front and rear ends thereof downwardly of the high-temperature cabinet 1c. There are four planar leg members 34 welded to the lower side of the high-temperature cabinet 1c so as to be parallel with and spaced by a distance from the four corresponding leg portions 33. Each pair of the leg portion 33 and member 34 are joined at the lower end by e.g. welding to a link sheet 33a.

Two, front and rear, pairs of the leg portions 33 and members 34 are joined each pair to the other by a couple of first link plates 35 by e.g. welding. The first link plates 35 are welded to the lowermost of the wall panel 31 of the high-temperature cabinet 1c. A couple of second link plates 36 are interposed between the leg portion 33 and the leg member 34 spaced from each other and welded at the upper end to the lower side of the high-temperature cabinet 1c. Accordingly, the leg portion 33, the leg member 34, the first link plate 35, and the second link plate 36 are joined to one another forming the upper support leg 32 and defining an inner space 37 in between.

Each the two, front and rear, upper support legs 32 are joined at the lower end to a lower support leg 38. A mount base B of this embodiment is composed of the two upper support legs 32 and the lower support leg 38. The lower support leg 38 is explained in more detail.

A frame 41 comprises an upper beam 42, a lower beam 43, a front beam 44, and a rear beam 45. The beams 42, 43, 44, and 45 are made of a U shaped steel channel. The upper beam 42 is tightened to the link sheets 33a of the upper support legs 32 by e.g. bolts and nuts not shown. The lower beam 43 extends at both front and rear ends outwardly of front and rear beams 44, 45, forming two anchor portions 46. The anchor portions 46 are anchored by unshown bolts and nuts to a foundation 21 in the same manner as of the first embodiment. Upright members 461 are secured by e.g. welding to the front beam 44, the rear beam 45, and the lower beam 43 for reinforcement between the anchor portions 46 of the lower beam 43 and the lower portions of the front 44 and rear 45 beams.

A couple of third link plates 47 made of e.g. steel sheets are welded to both sides of the frame 41 comprising the beams 42, 43, 44, and 45 respectively, closing the interior of the frame 41. More specifically, the four beams 42, 43, 44, and 45 and the two third link plates 47 constitute the lower support leg 38 having a box shape and located at each side of the cabinet 1c. The two opposite third link plates 47 are formed with two through holes 48 respectively through which a pipe 50 extends. The pipe 50 is secured at both ends by e.g. welding to the third link plates 47 and allows a cord 51 such as an power supply lead to pass through in no direct contact with its inner wall. It is understood that any other tube than the cord 51 for circulation of an absorbent, refrigerant, or cooling water may be passed across the pipe 50 in the same manner as of the first embodiment.

According to the second embodiment, the high-temperature cabinet 1c is supported by a combination of the upper support legs 32 and the lower support legs 38 joined to the upper support legs 32 and located on the foundation 21. The upper support leg 32 has a box-like shape comprising the leg portion 33, the leg member 34, and the first and second link plates 35, 36 while the lower support leg 38 has also a box-like shape comprising the four beams 42, 43, 44, and 45 and the two third link plates 47. As the first 35, second 35, and third 47 link plates serve as reinforcements for the leg portion 33, the leg member 34, and the frame 41, the mount base B composed of the upper support legs 32 and the lower support legs 38 is increased in the physical strength for supporting the high-temperature cabinet 1c. Hence, when a vibration caused by earthquake is transmitted from the foundation 21 through the upper and lower support legs 32 and 38 to the high-temperature cabinet 1c, it will be attenuated by the first, second, and third link plates 35, 36, and 47 preventing the deformation of the leg portions 33, the leg members 34, and the frames 41. As the weight of the high-temperature cabinet 1c is substantially supported by the upper and lower support legs 32 and 38, its tilting will be avoided. Therefore, there is no need of correction of the tilting or replacement of the legs. The absorption refrigerator can be operated with the help of common periodical maintenance service.

The mount base B comprises two sections, the upper support legs 32 and the lower support leg 38 which are separated before installation of the absorption refrigerator, for example, in a basement machine room. More particularly, when the refrigerator is installed in the machine room, its lower support legs 38 are first carried in and anchored on the foundation 21. Then, the high-temperature cabinet 1c is lowered and joined with its upper support legs 32 to the lower support legs 38. This allows the limitation of height at the entrance of the machine room, if any, to be cleared thus facilitating the installation.

For more ease of the installation, the upper support legs 32 are made smaller in the height than the lower support legs 38 so that the overall height of the high-temperature cabinet 1c with the upper support legs 32 is comparatively lower. The high-temperature cabinet 1c including a high-temperature regenerator will hence be seated at a higher level on the mount bases B reinforced in the mechanical strength.

The two third link plates 47 of the lower support leg 38 are joined to each other by the pipe 50 extending through the pipe holes 48 thereof and directly welded thereto. As the pipe 50 through which the cord 51 extends in no contact with its inner wall is welded to both the third link plates 47 which are thus increased in physical strength, it prevents generation of unwanted vibrating sounds on the third link plates 47 during the running of the absorption refrigerator.

The cord 51 extends in and along the pipe 50 fitted into the pile holes 48 provided in their respective third link plates 47 of the lower support leg 38 so that no detour wiring is needed about the upper 32 or lower support leg 38. Hence, the wiring length will be minimized and the wiring installation will be eased thus decreasing the overall cost of production.

The pipe 50 may permit any other tube than the cord, which extends to or from the absorber and the evaporator, and the unshown regenerator or condenser in the absorption refrigerator as explained with the first embodiment, to pass through and thus have not to detour the upper 32 or lower support leg 38. Accordingly, the tube is minimized in the overall length and its installation will be facilitated hence decreasing the production cost.

The pipe 50 may also be accompanied with the spacers described in the first embodiment for supporting the cord 51, whereby the same effect as of the first embodiment will be expected.

The present invention is not limited to the prescribed embodiments and various changes and modifications will be made without departing the scope of the present invention.

For example, the link plates 10, 35, 36, and 47 may be arranged not only in the front-to-rear direction but also in the left-to-right direction. The upright members 6 and 461 may be mounted at a right angle to but not in parallel with the link plates, so long as they are not directly joined to any link plates .

Although the first and second embodiments are explained in the form of mount bases for supporting the low-temperature cabinet 1a and the high-temperature cabinet 1c respectively, the mount bases may successfully be applied to a high-temperature cabinet of another type including the condenser and/or the low-temperature regenerator.

Accordingly, the mount eases will prevent the absorber and the low-temperature regenerator of the high-temperature cabinet from being affected by the vibration of earthquake hence allowing the absorption refrigerator to run continuously and providing the same effect as of the previous embodiments.

As set forth above, the mount base for used with an absorption refrigerator according to the present invention comprises a plurality of pairs of legs spaced by a distance from each other and mounted to a lower side of the cabinet such as the low-temperature and/or high-temperature cabinet, and a plurality of link plates securely joined to the legs thus forming an inner space defined by four sides beneath the cabinet, and will thus be increased in the physical strength for supporting the low-temperature and/or high-temperature cabinet. When the low-temperature and/or high-temperature cabinet is shaken by e.g. earthquake, it remains supported securely by the combination of the legs and the link plates, more specifically, the legs reinforced with the link plates and thus prevented from fracture or injury. As the low-temperature and/or high-temperature cabinet is securely supported by the legs and the link plates, its absorber, evaporator, and regenerator are protected from tilting and will hence allow the absorption refrigerator to run without interruption.

According to the second aspect of the present invention, the mount base is provided comprising a plurality of pairs of legs spaced by a distance from each other and mounted to a lower side of the low-temperature and/or high-temperature cabinet, a plurality of link plates securely joined to the legs thus forming an inner space defined by four sides beneath the cabinet, and a mount base foot mounted to a lower region of at least one of the paired legs and comprising an upright member joined to a side of the leg opposite to the link plate side and a horizontal sheet mounted to the lower end of the upright member and having a bolt hole(s) therein, whereby the legs are reinforced by the link plates like those defined in the first aspect, and the leg is anchored to the foundation by a bolt(s) extending across the bolt hole(s) of the mount base foot and tightened with a nut(s). This allows the installation of the low-temperature and/or high-temperature cabinet to the foundation to be eased and simplified. Also, as the mount base foot joined to the lower region of the leg is held and reinforced by the link plates in addition to the horizontal sheet, the leg will be prevented from bending at the joint of the mount base foot (at the upper end of the upright member) even if any undesired vibration caused by e.g. earthquake assaults and shakes the low-temperature and/or high-temperature cabinet.

As defined in the third aspect of the present invention, the mount base comprises at least one upper support leg composed of a plurality of pairs of legs spaced by a distance from each other and mounted to a lower side of the low-temperature and/or high-temperature cabinet and a plurality of link plates securely joined to the legs thus forming an inner space defined by four sides beneath the cabinet, and at least one lower support leg having a box-like shaped wall for supporting the upper support leg, whereby the physical strength of the upper and lower support legs will be increased. As the result, when the low-temperature and/or high-temperature cabinet is shaken by e.g. earthquake, its vibration hardly affect structural beams of the legs which are reinforced by the link plates. Accordingly, this will prevent the legs from bending and the low-temperature and/or high-temperature cabinet from tilting, hence allowing the absorption refrigerator to run normally with the help of routine maintenance service including checking of no leakage.

Since the mount base comprises the upper and the lower support legs, it can be separated for ease of the installation in a limited space such as a basement machine room. More particularly, the lower support legs are separated from the upper support legs on the low-temperature and/or high-temperature cabinet and anchored to the foundation before the cabinet is carried in and its upper support legs are joined to them. This allows the installation to be eased and less subject to the size of an entrance to the installation site.

According to the fourth aspect of the present invention, the mount base is provided comprising at least one upper support leg composed of a plurality of pairs of legs spaced by a distance from each other and mounted to a lower side of the low-temperature or high-temperature cabinet and a plurality of link plates securely joined to the legs thus forming an inner space defined by four sides beneath the cabinet, at least one lower support leg having a box-like shaped wall for supporting the upper support leg, and upright members mounted to lower regions of the box-like shaped wall of the lower support leg, whereby the same effect as depicted in the third aspect can be achieved as well as the lower support leg will be prevented from folding at e.g. the uppermost of the joint to the upright member when any vibration caused by earthquake assaults the low-temperature and/or high-temperature cabinet via the support legs.

What is claimed is:

1. A mount base for use with an absorption refrigerator to support a low-temperature and/or high-temperature cabinet of the absorption refrigerator, comprising: a plurality of pairs of U-shaped cross section legs spaced by a front to rear distance from each other and mounted to a lower side of said cabinet with the U-sections facing each other; and a plurality of coplanar link plates securely joined by butt welding to each free end of the U-sections so that opposing lateral sides of each pair of legs are continuous with each other, thus forming an inner space defined by four sides beneath the cabinet.

2. A mount base for use with an absorption refrigerator to support a low-temperature and/or high-temperature cabinet of the absorption refrigerator, comprising: a plurality of pairs of U-shaped cross section legs spaced by a front to rear distance from each other and mounted to a lower side of said cabinet with the U-sections facing each other; a plurality of coplanar link plates securely joined by butt welding to each free end of the U-sections so that opposing lateral sides of each pair of legs are made continuous with each other thus forming an inner space defined by four sides beneath the cabinet; and a mount base foot mounted to a lower region of at least one of said pairs of legs and comprising an elongated upright member joined to a side of the leg opposite to the side from which said link plates extend and a horizontal sheet mounted to a lower end of the elongated upright member and having at least one bolt hole therein.

3. The mount base as in claim 1 wherein each leg of said pairs of legs further comprise an upper support leg detachably connected with a lower support leg, each said upper support leg being spaced by a distance from the others of said upper support legs and mounted to a lower side of said cabinet; and each said lower support leg having a docking surface for supporting a respective said upper support leg.

4. The mount base as in claim 2 wherein each leg of said pairs of legs further comprise an upper support leg detachably connected with a lower support leg, each said upper support leg being spaced by a distance from the others of said upper support legs and mounted to a lower side of said cabinet and each said lower support leg having a docking surface for supporting a respective said upper support leg.

* * * * *